United States Patent
Monahan et al.

(10) Patent No.: US 7,511,768 B2
(45) Date of Patent: Mar. 31, 2009

(54) DYNAMIC FILTER TO LIMIT RINGING

(75) Inventors: Chuck Monahan, Mountain View, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 677 days.

(21) Appl. No.: 11/072,204

(22) Filed: Mar. 4, 2005

(65) Prior Publication Data
US 2006/0198267 A1    Sep. 7, 2006

(51) Int. Cl.
*H04N 5/21* (2006.01)
*H04N 5/213* (2006.01)

(52) U.S. Cl. .................. 348/607; 348/625

(58) Field of Classification Search .......... 348/607, 348/625; 381/94.1, 94.8; 375/346; 455/114.2, 455/296, 307–312; 382/266, 275
See application file for complete search history.

(56) References Cited

U.S. PATENT DOCUMENTS

| | | | | |
|---|---|---|---|---|
| 4,334,317 A | * | 6/1982 | Beesley | 455/194.1 |
| 5,491,520 A | * | 2/1996 | Nozawa et al. | 348/625 |
| 5,717,296 A | * | 2/1998 | Onozawa et al. | 315/371 |
| 5,729,145 A | * | 3/1998 | Blades | 324/536 |
| 6,252,360 B1 | * | 6/2001 | Ito et al. | 315/411 |
| 2006/0045529 A1 | * | 3/2006 | Best | 398/99 |

* cited by examiner

*Primary Examiner*—Victor R Kostak
(74) *Attorney, Agent, or Firm*—McAndews, Held & Malloy Ltd.

(57) ABSTRACT

A media processing system for limiting ringing in a filter output. A detection filter receives a media signal and generates a detection signal. The detection signal has a constant value over sections of the media signal having a consistent DC bias. The value of the detection signal changes when the DC bias of the media signal changes. The control module receives the detection signal and determines if the media signal may result in ringing based on the detection signal. If it is determined the media signal may result in ringing, a smoothing filter is applied to the media signal.

17 Claims, 7 Drawing Sheets

DYNAMIC FILTER TO LIMIT RINGING

FIELD OF THE INVENTION

The present invention relates generally to signal processing systems, and more particularly to limiting filter-induced ringing in a video signal.

BACKGROUND OF THE INVENTION

Figure 1:
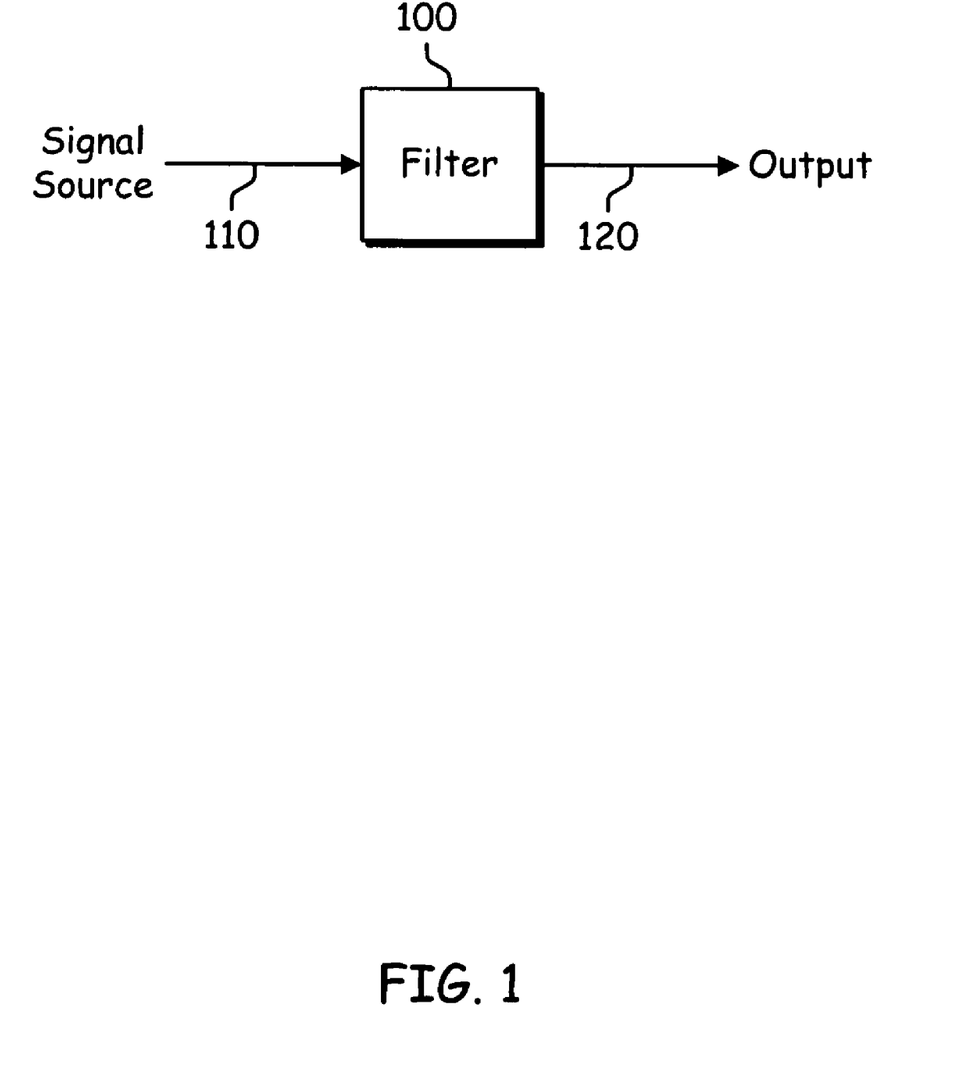
FIG. 1 is a block diagram showing a filter that receives a signal from a signal source and produces a filtered output.
Figure 2:
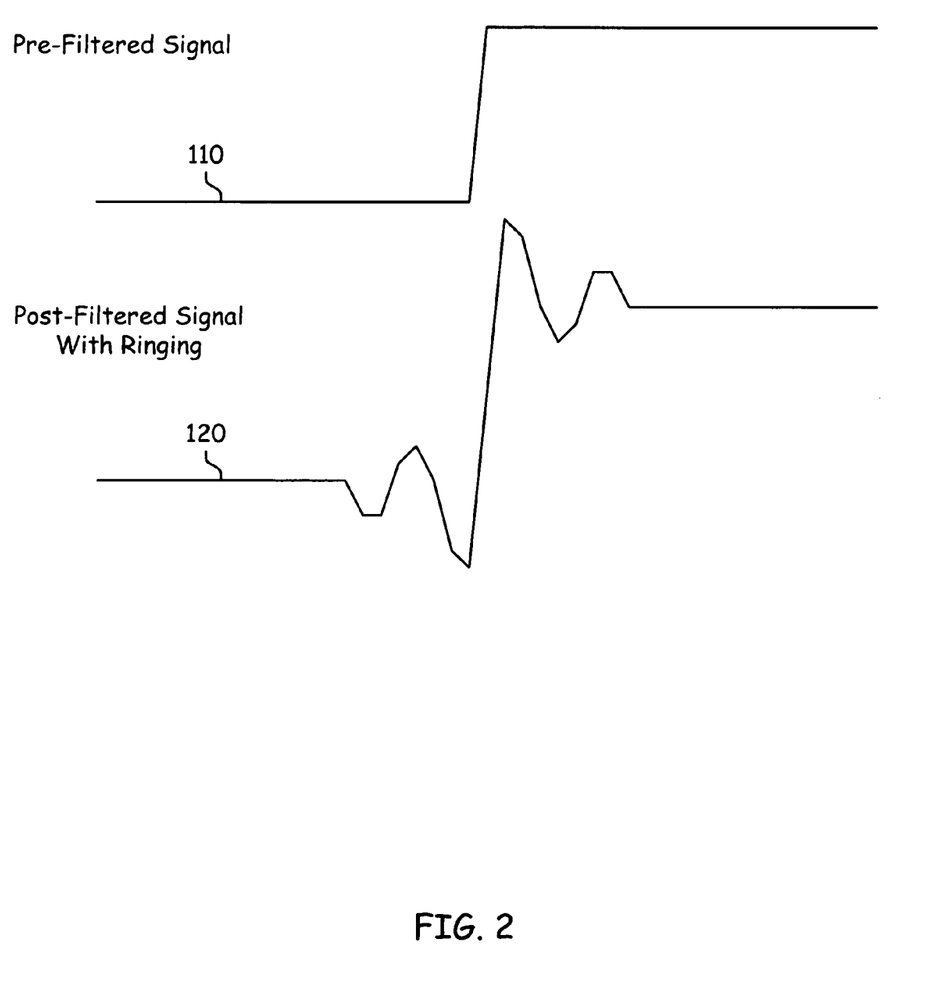
FIG. 2 is a set of graphs showing a pre-filtered signal and a post-filtered signal 120 containing ringing.

Filtering a signal can result in ringing in the filtered output. FIG. 1 is a block diagram showing a filter 100 that receives a signal 110 from a signal source and produces a filtered output 120. Filtering the received signal 110 can result in ringing on the filtered output signal 120. For example, the input signal 110 in FIG. 1 can be a video signal and the filter 100 a bandwidth limiting filter. Filtering a video signal, to meet bandwidth limits, for example, often results in ringing in the filtered output. Such ringing can result, for example, from filtering a unit step as shown in FIG. 2. FIG. 2 shows a pre-filtered signal 110 and a post-filtered signal 120 containing ringing. Where the signal is a video signal, this ringing degrades the contrast of the resulting video image. The unit step is the most extreme example of a set of input changes that result in ringing. The common characteristic of this set is that the average value within the sliding window used by the filter suddenly changes. This characteristic will be referred to herein as a shift in the DC bias of the signal.

Further limitations and disadvantages of conventional and traditional approaches will become apparent to one of skill in the art through comparison of such systems with the present invention as set forth in the remainder of the present application with reference to the drawings.

BRIEF SUMMARY OF THE INVENTION

One illustrative embodiment of the present invention is directed to a method of identifying a portion of a media signal that may result in ringing. Pursuant to the method, a detection signal is generated. The detection signal has a constant value over sections of the media signal having a consistent DC bias. The value of the detection signal changes when the DC bias of the media signal changes. It is determined if the media signal may result in ringing based on the detection signal.

Another illustrative embodiment of the present invention is directed to a media processing system having a detection filter and a control module. The detection filter receives a media signal and generates a detection signal. The detection signal has a constant value over sections of the media signal having a consistent DC bias. The value of the detection signal changes when the DC bias of the media signal changes. The control module receives the detection signal and determines if the media signal may result in ringing based on the detection signal.

Another embodiment of the present invention is directed to a method of processing a media signal to limit ringing in the signal. Pursuant to the method, a detection signal is generated. The detection signal has a constant value over sections of the media signal having a consistent DC bias. The value of the detection signal changes when the DC bias of the media signal changes. It is determined if the media signal may result in ringing based on the detection signal. A smoothing function is applied to the media signal if it is determined that the media signal may result in ringing.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION OF THE INVENTION

The present invention improves overall video quality by identifying sections of the input stream that contain unit steps that would result in ringing and then modifying those sections to smooth out the transition and limit the effect of ringing.

Figure 3:
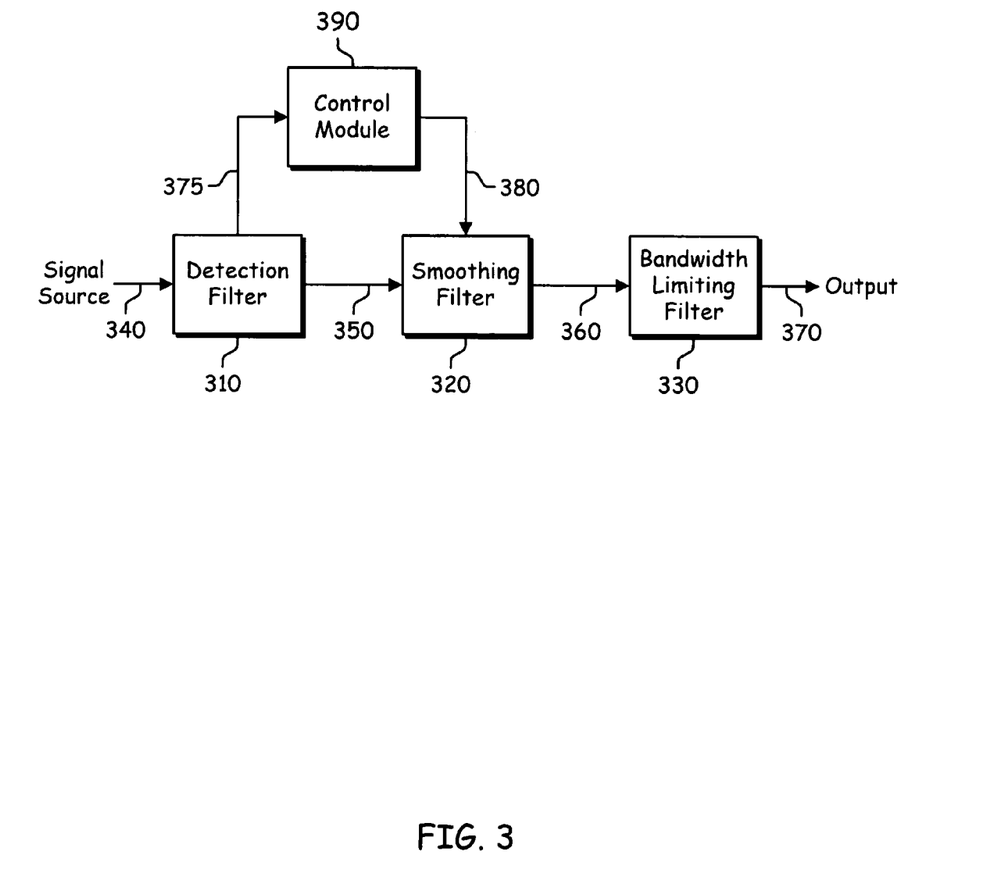
FIG. 3 is a functional block diagram representing a system for limiting ringing in the output of a filter such as bandwidth limiting filter, in accordance with an illustrative embodiment of the present invention.

FIG. 3 is a functional block diagram representing a system for limiting ringing in the output of a filter such as bandwidth limiting filter 330, in accordance with an illustrative embodiment of the present invention. The system includes a detection filter 310, a smoothing filter 320 and a control module 390. The detection filter 310 receives a signal 340 from a signal source. The detection filter 310 produces a filter output 375 that is indicative of whether the input signal 340 is likely, after filtering by the bandwidth filtering filter 330, to result in ringing in the output signal 370, as will be described in greater detail below. The detection filter 310 passes the input signal 340 on to the smoothing filter 320 as signal 350. The filter output 375 of the detection filter 310 is provided to the control module 390. The control module 390 determines whether or not the present section of the input signal 340 is likely to result in ringing in the output of the bandwidth limiting filter 330 based upon the output 375 of the detection filter 310. The control module 390 provides a control signal 380 to the smoothing filter 320. If the control module 390 determines that a portion of the input signal 340 is likely to result in ringing in the output signal 370, the control module 390 provides an enabling control signal to the smoothing filter 320. If the control module 390 determines that the present section of the input signal 340 is not likely to result in ringing in the output signal 370, the detection filter provides a disabling control signal to the smoothing filter 320. If the smoothing filter 320 is enabled by the control module 390, the smoothing filter 320 modifies the section of the input signal 350 that has been determined to be likely to result in ringing, by smoothing out the transition in the input signal, as will be described in more detail below. Smoothing out the transitions in the input signal limits the effect of ringing in the filtered output signal 370. The smoothing filter 320 then provides the modified signal 360 to the bandwidth limiting filter 330. If the smoothing filter 320 is disabled by the control module 390, the smoothing filter 320 does not perform any processing of the input signal 350 but rather passes the input signal 350 unmodified to the bandwidth limiting filter 330 as signal 360. The bandwidth limiting filter 330 filters the input signal 360 and produces filtered output signal 370.

The detecting filter 310 detects changes to the DC bias by filtering the input signal. The detection filter 310 produces a filter output 375, which will also be referred to herein as a detection signal. The detection signal 375 produced by the detection filter 310 has a constant value over sections of the input signal 340 having a consistent DC bias. Conversely, the value of the detection signal 375 changes when the DC bias of the input signal 340 changes. In an illustrative embodiment of the present invention, such a detection filter is implemented with a filter having coefficients [−4 9 −22 208 −208 22 −9 4]. A detection filter having these coefficients produces a constant value over sections of a consistent DC bias and generates an amplitude change corresponding to changes of the DC bias. The key sections of the input stream are identified by these amplitude changes.

Figure 4:
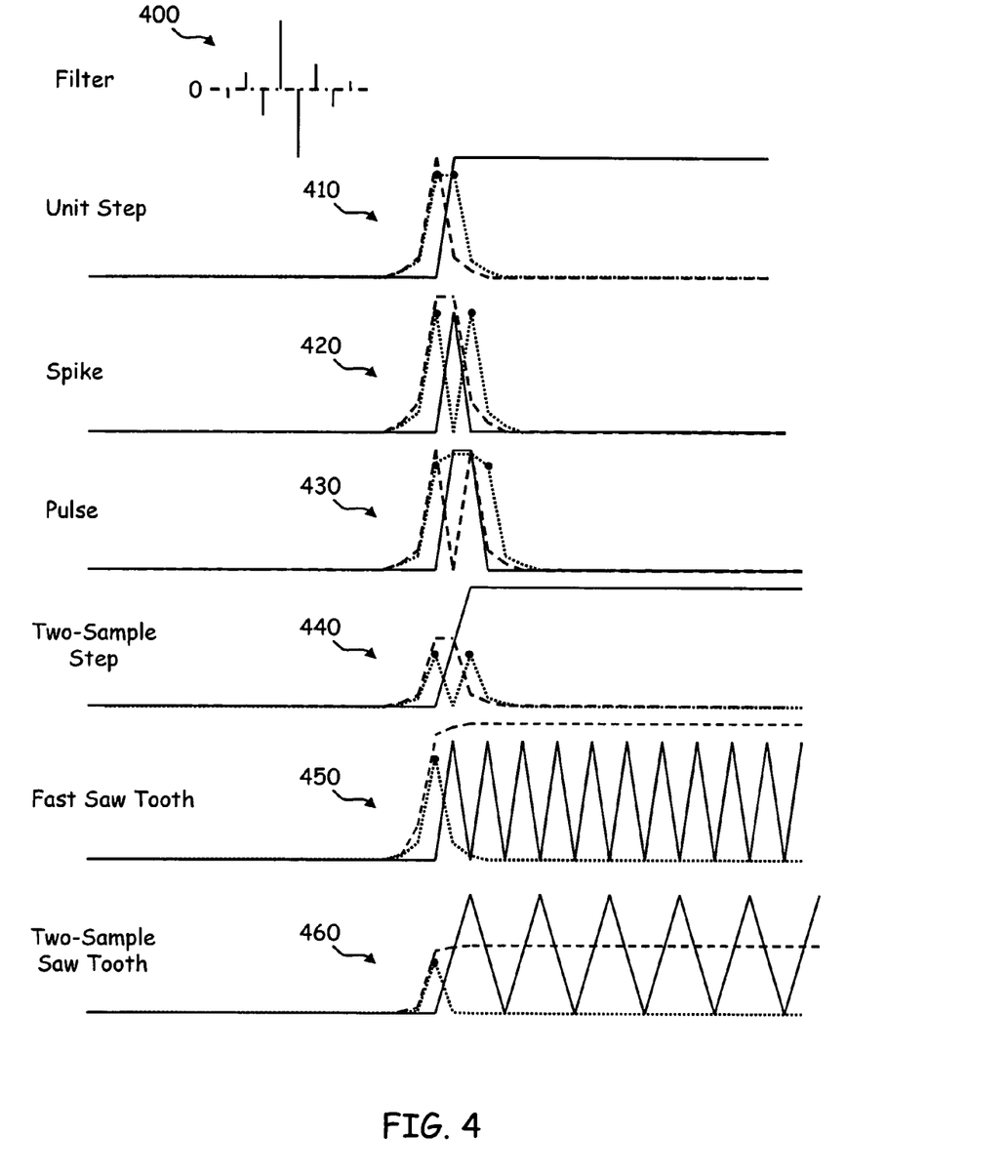
FIG. 4 is a set of graphs plotting an input signal and the resultant output of a detecting filter, in accordance with an illustrative embodiment of the present invention.

FIG. 4 is a set of graphs plotting the input signal 340 and the resultant output 375 of the detecting filter 310 for a detecting filter 310 having the coefficients [−4 9 −22 208 −208 22 −9 4]. Plot 400 represents the detecting filter 310 having said coefficients. graphs 410-460 plot the input signal 340 and the resultant output 375 of the detecting filter 310 for input signals comprising a unit step 410, a spike 420, a pulse 430, a two sample step 440, a fast saw tooth 450 and a two-sample saw tooth 460. In graphs 410-460, the input signal 340 is depicted with a solid line and the detection filter output 375 is depicted with a dashed line. Graphs 410-460 also show the change Δ in the detection signal 375 in dotted line. The unit step 410, the spike 420, the pulse 430, and two-sample step 440 all result in dramatic changes in the amplitude of the detection filter output 375. By contrast, the saw-tooth waveforms 450 and 460 have two distinct sections: a change in the detection signal 375 as the saw-tooth pattern starts and a consistent higher amplitude of the detection signal 375 during the saw-tooth pattern itself. The only changes to the amplitude of the detection filter output 375 occur as the saw-tooth pattern starts.

According to an illustrative embodiment of the present invention, the control module 390 looks at changes in the output 375 of the detection filter 310 to identify sections of the input signal 340 that could result in ringing. Aspects of the invention will be described below with reference to a video signal processing system. It will be appreciated however, that the present invention is applicable to any signal processing system, including any type of media signal processing system. According to an illustrative embodiment of the present invention, if the change in the output 375 of the detection filter 310 for the current pixel (or other signal sample) is greater than the change in the detection filter output 375 for the two proceeding samples, or the two following samples, the control module 390 concludes that the input signal 340 is likely to result in ringing in the output of the bandwidth limiting filter 330, and therefore enables the smoothing filter. In a further illustrative embodiment, the change in the output 375 of the detection filter 310 for the current pixel (or other signal sample) must be greater than the change in the detection filter output 375 for the two proceeding samples, or the two following samples, by a specified factor in order for the control module 390 to conclude that the input signal 340 is likely to result in ringing. In another embodiment of the present invention, if the change in the output 375 of the detection filter 310 for the current pixel (or other signal sample) is greater than a predetermined amount, the control module 390 concludes that the input signal 340 is likely to result in ringing in the output of the bandwidth limiting filter 330, and therefore enables the smoothing filter.

In another, preferred, embodiment of the present invention, all of the criteria in the preceding paragraph are employed to determine if the input signal 340 is likely to result in ringing. Thus, according to this embodiment, the control module 390 identifies sections of the input signal 340 that could result in ringing using the following formulae:

$$\Delta_n = |(|\text{filt}(\text{pixel}_n)| - |\text{filt}(\text{pixel}_{n+1})|)|$$

for a given pixel n, the control module concludes that the input signal is likely to result in ringing if:

$$[\{[\Delta_n > X^*\Delta_{n-1}] \text{ AND } [\Delta_n > X^*\Delta_{n-2}]\} \text{ OR}$$

$$\{[\Delta_{n+1} > X^*\Delta_n] \text{ AND } [\Delta_{n+2} > X^*\Delta_n]\}] \text{ AND}$$

$$\Delta_n > Y$$

In other words, if the change for the current pixel is greater than the change of the two proceeding or two following samples, the control module 390 enables the smoothing filter 320. The constants X and Y specify the amount of change that a particular design requires. In FIG. 4, the plots of the change $\Delta_n$ (shown in dashed lines) in the detection filter output 375 are marked with a darkened dot to indicate where this threshold has been met for a specific value of X and Y.

In an illustrative embodiment, the criteria are broken down into two steps. In one step, it is determined if the change in the detection filter output 375 is large enough to warrant attention. This is accomplished in the formula above by comparing $\Delta_n$ to the predetermined value Y. In another step it is determined if the change is large compared to preceding or succeeding changes. This is accomplished by the "X" portion of the above formula. The first test (the "Y" test) prevents unnecessary distortions when the detection signal 375 is barely moving. Note that if $\Delta_n = 0$, then it will always pass the "X" test. Yet there is nothing to smooth.

Figure 5:
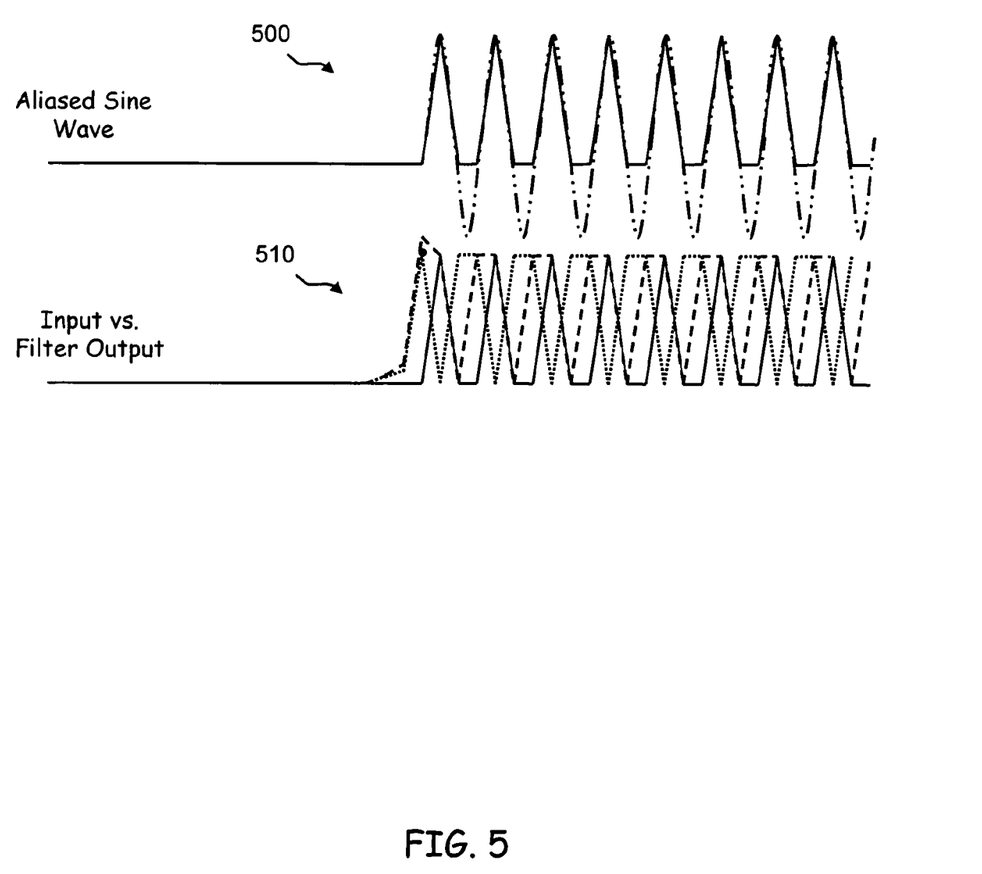
FIG. 5 is a set of graphs showing an aliased sine wave input and the resultant output of a detecting filter, in accordance with an illustrative embodiment of the present invention.

Comparing the change in the detection filter output 375 to two successive change values addresses a specific issue concerning aliasing of a sine wave. FIG. 5 shows a pair of graphs. Graph 500 shows an actual sine wave in dashed line and a corresponding aliased sine wave in solid line. The shape of the aliased sine wave is a product of the fact that the signal is sampled at discrete points. A sine wave should not result in a change in the DC bias, but as a sine wave approaches the sampling frequency, the input signal can appear to be a series of pulses, as can be seen in graph 500. Graph 510 plots the input signal 340 (solid line) and the resultant output 375 (dashed line) of the detecting filter 310 for an input signals comprising an aliased sine wave. Graph 510 also shows the change $\Delta_n$ in the detection signal 375 in dotted line. Reviewing the output 375 of the detection filter 310 and the corresponding $\Delta_n$ values, it can be seen that there is a large change in the value of the detection signal 375 relative to the previous sample, but not relative to the previous two samples. In graph 510, the plot of the change $\Delta_n$ (shown in dashed lines) in the detection filter output 375 is marked with a darkened dot to indicate where this threshold has been met for a specific value of X and Y.

Thus according to an illustrative embodiment of the present invention, if it is determined that the input signal 340 is likely to result in ringing in the output 370 of the bandwidth filter 330, the transitions to a new DC bias in the input signal 340 are softened in order to minimize the ringing in the filter output 370. In an exemplary embodiment, if the control module 390 determines that the input signal is likely to result in ringing in the output 370 of the bandwidth filter 330, the control module enables the smoothing filter 330 via control signal 380. The smoothing filter 320 softens the transitions to the new DC bias, thereby minimizing ringing in the output 370 of the bandwidth limiting filter 330. It is important to note that the smoothing filter is selectively applied or not applied to the input stream 350. This is different from simply filtering the entire input stream. Aspects of the present invention do not necessarily attempt to remove all ringing from the output. The purpose of this selective nature is to leave a majority of the input image at its original quality, and only tweaking those transition points that might introduce ringing. Aspects of the present invention exploit the fact that ringing below a certain level is practically imperceptible to the human eye. In an illustrative embodiment, the smoothing filter 320 that is used to alter these points uses purely positive coefficients (such as [0.25 0.5 0.25]) in order to prevent the smoothing filter 320 from introducing its own ringing.

Figure 6:
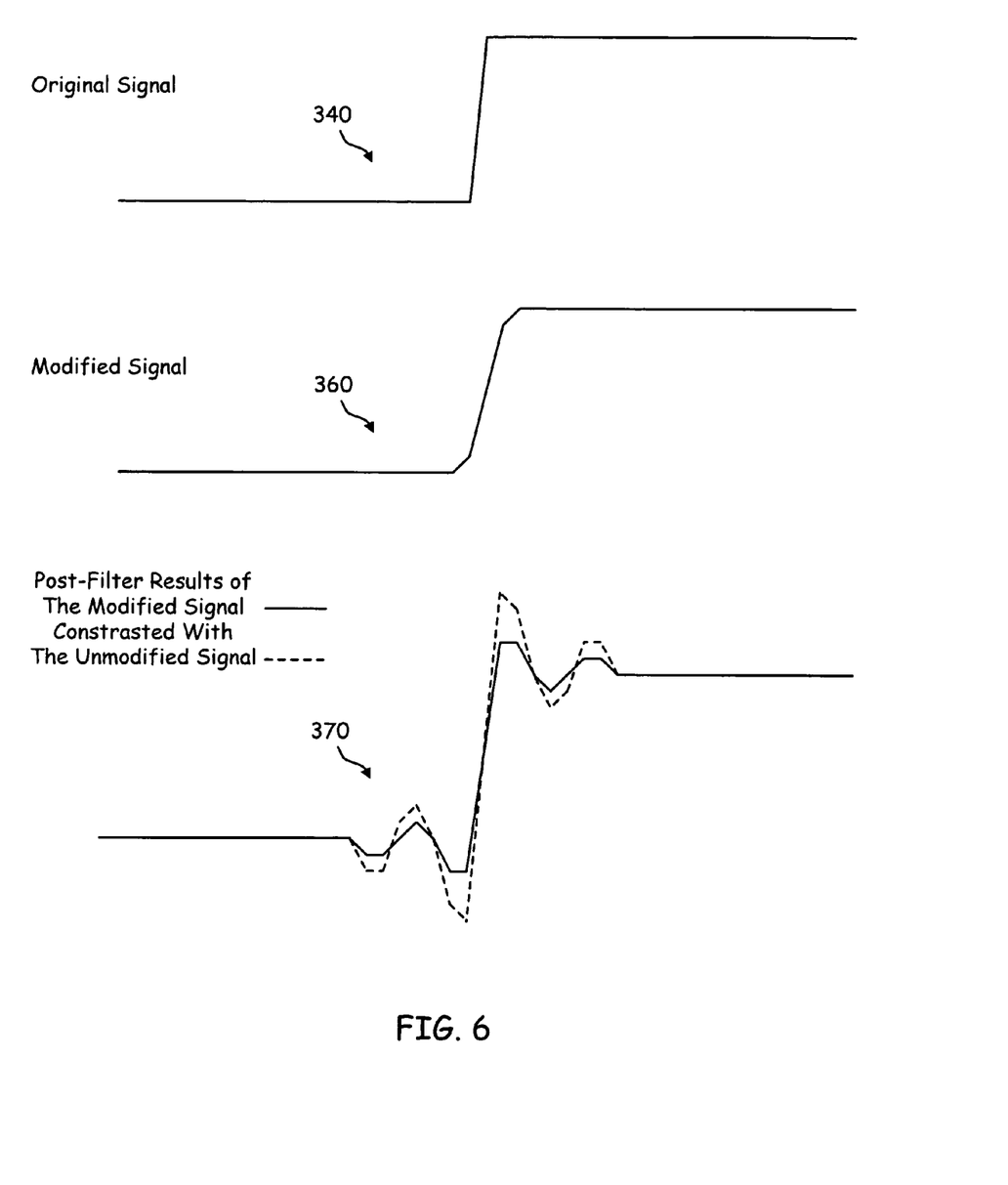
FIG. 6 is a set of graphs depicting an input signal, a modified signal representing the output of a smoothing filter, and a filter output signal, according to an illustrative embodiment of the present invention.

FIG. 6 is a set of graphs depicting an input signal, such as input signal 340, a modified signal representing the output 360 of the smoothing filter 320, and a filter output signal, such as the output 370 of bandwidth limiting filter 330. The graph plotting filter output signal 370 shows in solid line an illustrative output of filter 330 where the input signal 360 to the filter 330 is the modified signal 360, which has been modified by the smoothing filter 320. The graph plotting filter output signal 370 shows in dashed line an illustrative output of filter 330 where the input signal the filter 330 is the original input signal 340, unmodified by the smoothing filter 320. As can be seen in FIG. 6, the signal 360 that has been modified by the smoothing filter 320 has smoother transitions than the unmodified signal 340. As can also be seen in FIG. 6, these smoother transitions in the input signal 360 result in less ringing in the output signal 370.

Figure 7:
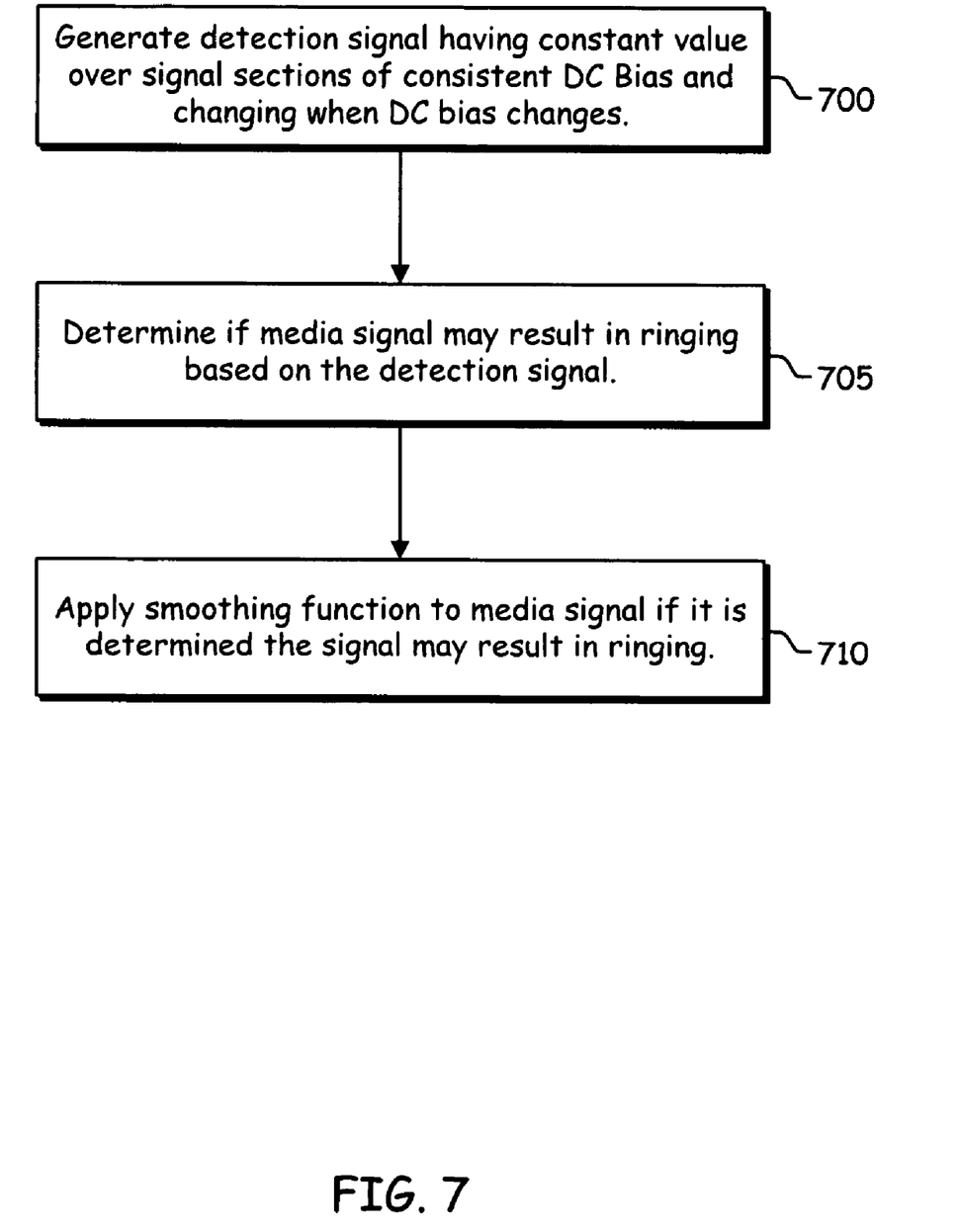
FIG. 7 is a flowchart representing a method of processing a media signal to limit ringing in the signal.

FIG. 7 is a flowchart representing a method of processing a media signal to limit ringing in the signal. At step 700, a detection signal is generated, wherein the detection signal has a constant value over sections of the media signal having a consistent DC bias and wherein the value of the detection signal changes when the DC bias of the media signal changes. At step 705, it is determined if the media signal may result in ringing based on the detection signal. At step 710, a smoothing function is applied to the media signal if it is determined that the media signal may result in ringing.

Although a preferred embodiment of the present invention has been described, it should not be construed to limit the scope of the appended claims. For example, the present invention is applicable to any type of media, including audio, in addition to the video media illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

The invention claimed is:

1. A method of identifying a portion of a media signal that may result in ringing, the media signal comprising a succession of signal samples, the method comprising:

generating a detection signal, wherein the detection signal has a constant value over sections of the media signal having a consistent DC bias and wherein the value of the detection signal changes when the DC bias of the media signal changes;

comparing a change in the value of the detection signal for a current sample to a change in the value of the detection signal for samples neighboring the current sample; and determining if ringing may occur at the current sample of the media signal based on the difference between the change in the value of the detection signal for the current sample and the change in the value of the detection signal for the neighboring samples.

2. The method of claim 1 wherein determining if ringing may occur comprises:

comparing a change in the value of the detection signal for the current sample to a change in the value of the detection signal for the two samples preceding the current sample in the succession of samples;

comparing a change in the value of the detection signal for the current sample to a change in the value of the detection signal for the two samples following the current sample in the succession of samples; and if the change in the value of the detection signal for the current sample is greater than the change in the value of the detection signal for each of the two preceding samples, or if the change in the value of the detection signal for the current sample is greater than the change in the value of the detection signal for each of the two following samples, declaring that ringing may occur in the media signal at the current sample.

3. The method of claim 1 wherein determining if ringing may occur comprises:

comparing a change in the value of the detection signal for the current sample to a change in the value of the detection signal for the two samples preceding the current sample in the succession of samples;

comparing a change in the value of the detection signal for the current sample to a change in the value of the detection signal for the two samples following the current sample in the succession of samples; and if the change in the value of the detection signal for the current sample is greater than the change in the value of the detection signal for each of the two preceding samples by at least a predetermined factor, or if the change in the value of the detection signal for the current sample is greater than the change in the value of the detection signal for each of the two following samples by at least the predetermined factor, declaring that ringing may occur in the media signal at the current sample.

4. The method of claim 1 wherein the media signal is a video signal and wherein the succession of signal samples correspond to pixels of a video image.

5. The method of claim 1 wherein the media signal is a video signal.

6. A media processing system comprising:

a detection filter operable to receive a media signal comprising a succession of signal samples and to generate a detection signal, wherein the detection signal has a constant value over sections of the media signal having a consistent DC bias and wherein the value of the detection signal changes when the DC bias of the media signal changes; and a control module operable to compare a change in the value of the detection signal for a current sample to a change in the value of the detection signal for samples neighboring the current sample and wherein the control module is operable to determine if ringing may occur at the current sample of the media signal based on the difference between the change in the value of the detection signal for the current sample and the change in the value of the detection signal for the neighboring samples.

7. The system of claim 6, further comprising:

a smoothing filter operable to receive the media signal and to selectively apply a smoothing function to the media signal in response to a control signal provided by the control module, wherein the control signal enables the smoothing filter if the control module determines that ringing may occur at the current sample of the media signal.

8. The system of claim 7 wherein the control module is operable to compare a change in the value of the detection signal for the current sample to a change in the value of the detection signal for the two samples preceding the current sample in the succession of samples and to compare a change in the value of the detection signal for the current sample to a change in the value of the detection signal for the two samples following the current sample in the succession of samples, and wherein the control module enables the smoothing filter if the change in the value of the detection signal for the current sample is greater than the change in the value of the detection signal for each of the two preceding samples, or if the change in the value of the detection signal for the current sample is greater than the change in the value of the detection signal for each of the two following samples.

9. The system of claim 7 wherein the control module is operable to compare a change in the value of the detection signal for the current sample to a change in the value of the detection signal for the two samples preceding the current sample in the succession of samples and to compare a change in the value of the detection signal for the current sample to a change in the value of the detection signal for the two samples following the current sample in the succession of samples, and wherein the control module enables the smoothing filter if the change in the value of the detection signal for the current sample is greater than the change in the value of the detection signal for each of the two preceding samples by at least a predetermined factor, or if the change in the value of the detection signal for the current sample is greater than the change in the value of the detection signal for each of the two following samples by at least the predetermined factor.

10. The system of claim 6 wherein the media signal is a video signal and wherein the succession of signal samples correspond to pixels of a video image.

11. The system of claim 6 wherein the media signal is a video signal.

12. A method of processing a media signal to limit ringing in the signal, the media signal comprising a succession of signal samples, the method comprising:

generating a detection signal, wherein the detection signal has a constant value over sections of the media signal having a consistent DC bias and wherein the value of the detection signal changes when the DC bias of the media signal changes;

comparing a change in the value of the detection signal for a current sample to a change in the value of the detection signal for samples neighboring the current sample;

determining if ringing may occur at the current sample of the media signal based on the difference between the change in the value of the detection signal for the current sample and the change in the value of the detection signal for the neighboring samples; and applying a smoothing function to the media signal if it is determined that ringing may occur at the current sample of the media signal.

13. The method of claim 12 wherein the comparing step comprises:

comparing a change in the value of the detection signal for the current sample to a change in the value of the detection signal for the two samples preceding the current sample in the succession of samples; and comparing a change in the value of the detection signal for the current sample to a change in the value of the detection signal for the two samples following the current sample in the succession of samples.

14. The method of claim 13 wherein applying a smoothing function to the media signal if it is determined that ringing may occur at the current sample of the media signal comprises:

applying a smoothing function to the media signal at the current sample if the change in the value of the detection signal for the current sample is greater than the change in the value of the detection signal for each of the two preceding samples, or if the change in the value of the detection signal for the current sample is greater than the change in the value of the detection signal for each of the two following samples.

15. The method of claim 13 wherein applying a smoothing function to the media signal if it is determined that ringing may occur at the current sample of the media signal comprises:

applying a smoothing function to the media signal at the current sample if the change in the value of the detection signal for the current sample is greater than the change in the value of the detection signal for each of the two preceding samples by at least a predetermined factor, or if the change in the value of the detection signal for the current sample is greater than the change in the value of the detection signal for each of the two following samples by at least the predetermined factor.

16. The method of claim 12 wherein the media signal is a video signal and wherein the succession of signal samples correspond to pixels of a video image.

17. The method of claim 12 wherein the media signal is a video signal.

* * * * *